United States Patent [19]
Fetzer et al.

[11] 3,744,089
[45] July 10, 1973

[54] MEAT TENDERIZER
[75] Inventors: Fred Fetzer, Strongsville; Ronald P. Miranda, Sandusky, both of Ohio
[73] Assignee: Bettcher Industries, Inc., Birmingham, Ohio
[22] Filed: Feb. 4, 1972
[21] Appl. No.: 223,501

Related U.S. Application Data
[62] Division of Ser. No. 17,668, March 9, 1970, Pat. No. 3,654,664.

[52] U.S. Cl. .................................................. 17/25
[51] Int. Cl. ............................................. A22c 9/00
[58] Field of Search ............................ 17/25, 28, 30

[56] References Cited
UNITED STATES PATENTS

| | | | |
|---|---|---|---|
| 266,576 | 10/1882 | Zimmer | 17/30 |
| 2,408,747 | 10/1946 | Ahrndt | 17/25 |
| 2,830,317 | 4/1958 | Fleiss | 17/25 |

Primary Examiner—Lucie H. Laudenslager
Attorney—James T. Hoffmann

[57] ABSTRACT

As a meat product travels intermittently along a horizontal conveyor belt by fixed increments, a plurality of downwardly directed tenderizing knives having cylindrical shanks and wide, flat, pointed blades at the lower end having inclined side cutting edges carried by a vertically reciprocating ram carriage are moved from a position above the meat downwardly through the meat and then withdrawn upwardly. A stripper carriage associated with the ram carriage follows the latter during its downward stroke leaving a stripper frame resting on top of the meat. The stripper frame is locked in that position until the tenderizing knives move upwardly out of the meat, at which time the stripper frame is unlocked and moves upwardly propelled by the ram carriage. Timing means causes said conveyor belt to move only when said blades are clear of said meat. Means is provided for varying the increment of conveyor belt travel while the machine is running.

2 Claims, 8 Drawing Figures

MEAT TENDERIZER

RELATED APPLICATIONS

This application is a division of application, Ser. No. 17,668, filed Mar. 9, 1970, now U.S. Pat. No. 3,654,664, issued Apr. 11, 1972.

FIELD OF THE INVENTION

This application relates to meat tenderers.

PRIOR ART

Meat tenderizers of the type to which the present invention relates are known in the prior art but the tenderizing knives employed therein were either thin, flat members that would not flex but in one direction upon striking a hard obstacle in meat being pierced and therefore were very susceptible to being damaged during use or were only suitable for use with deboned meat and/or had chisel or fish-tail-like cutting blades.

SUMMARY OF INVENTION

This invention provides a novel and improved apparatus for the tenderizing of chunks of meat. The meat is fed by a conveyor to a position beneath a ram carriage which reciprocates in a vertical direction. The ram carriage is provided with a multiplicity of downwardly pointing tenderizing knives having cylindrical shanks and wide, flat, pointed blades with upwardly side cutting edges which pierce the meat at each downward stroke of the ram carriage. A stripper carriage moves downwardly freely during the downward stroke of the ram carriage and is provided with a stripper frame which stops when it comes in contact with the upper surface of the meat. The stripper frame has openings through which the spear-like blades of the tenderizing knives are free to pass downwardly into the meat. Locking pawls carried by the stripper carriage are locked relative to the frame of the machine before the ram starts to withdraw the tenderizing knives upwardly out of the meat. The stripper frame prevents the meat lifting from the conveyor while the knives are withdrawn. Upon the emergence of the tenderizing knives upwardly out of the meat, the locking pawls are released and thereafter the stripper carriage moves upwardly with the ram carriage. Drive means is provided for advancing the conveyor by increments when the tenderizing knives are in an upper position withdrawn from the meat so as to advance a new portion of the meat to a location immediately beneath the tenderizing knives for the next stroke.

The invention includes a strong and serviceable arrangement of the coacting parts for carrying out their functions, together with means for properly timing all of the operations of the apparatus and including means for varying the increment of advance of the conveyor while the machine is running if desired.

Other objects and advantages of this invention will be apparent from the accompanying drawings and description and the essential features thereof will be set forth in the appended claims.

Figure 1:
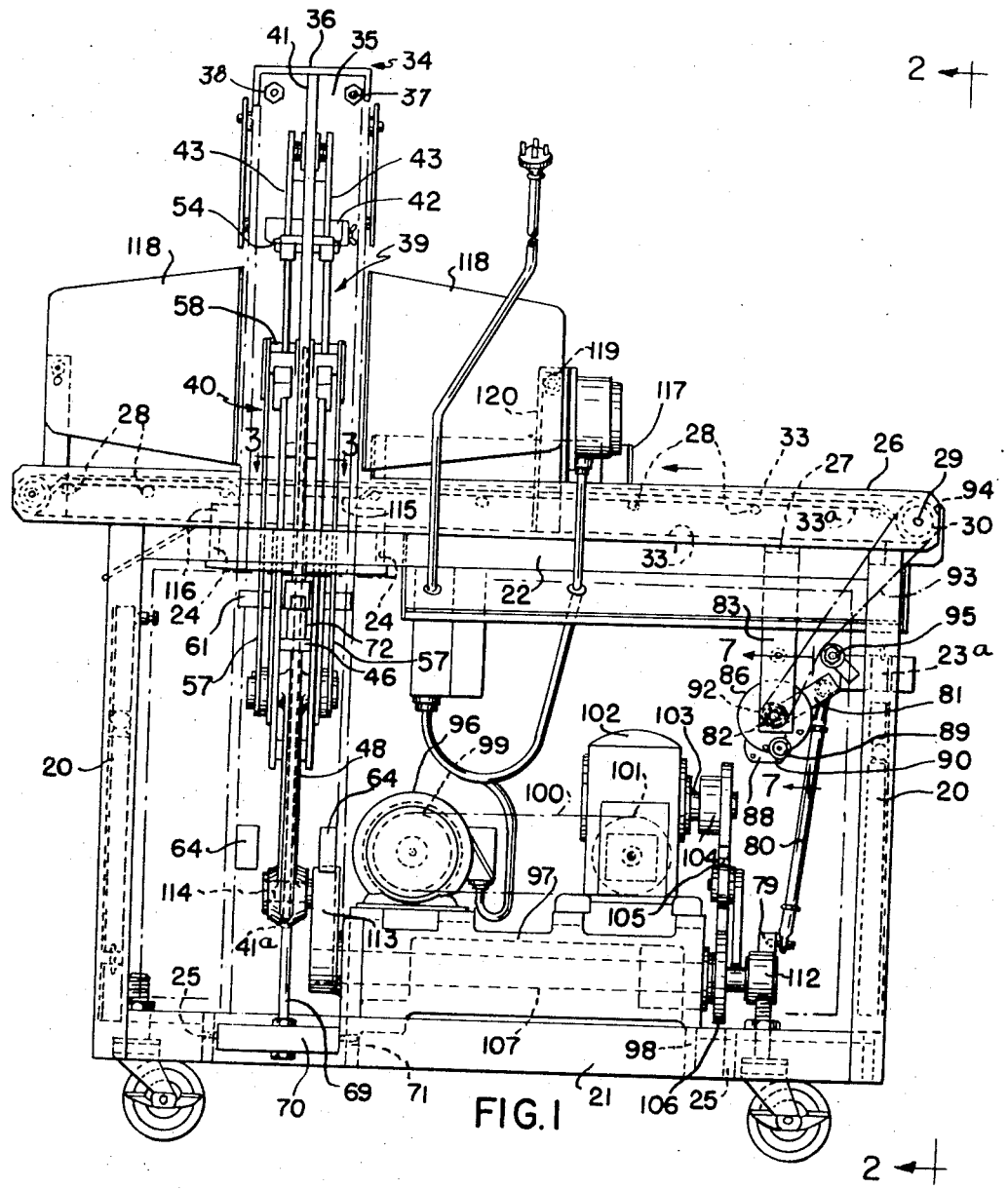
FIG. 1 is a side elevational view of a machine embodying the invention.

The main frame of the machine comprises four vertical corner posts 20, parallel bottom side frame members 21, parallel top side frame members 22, parallel bottom end members 23, top end member 23a, top spacer bars 24, bottom spacer bars 25, and sufficient bracing members to provide a substantially rigid framework.

Figure 2:
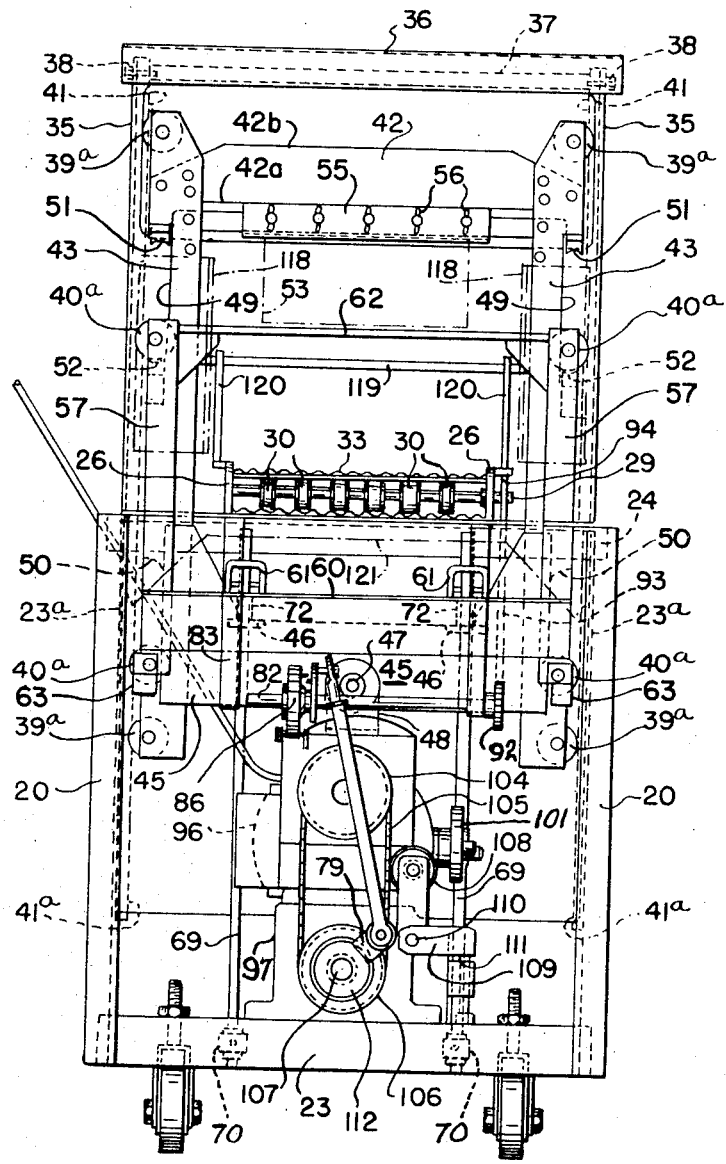
FIG. 2 is an end elevational view taken from the position of the line 2—2 at the right-hand end of FIG. 1 and with certain parts omitted or shown in dash-dot lines to clarify the description.

The conveyor comprises two parallel side rails 26 supported by the top spacer bars 24 and a conveyor support member 27 which is part of the main frame. The side rails are also tied together by a plurality of cross bars 28. At the right-hand end of FIG. 1, a conveyor drive shaft 29 is rotatably mounted in the side rails 26. A drive sprocket 94 is fixed to the right-hand end of shaft 29 as viewed in FIG. 2. Also, a plurality of conveyor engaging sprockets 30 are secured to shaft 29 to rotate therewith. At the left-hand end of the conveyor, as seen in FIG. 1, an idler roll shaft 31 is rotatably mounted in the side rails 26 and carries a plurality of idler sprockets 32 aligned with the sprockets 30 at the opposite end. A conveyor belt 33 of a very open wire mesh has an upper working run adapted to travel in the direction of the arrow of FIG. 1 and having a return run at 33' traveling in the opposite direction. This conveyor belt passes over the sprockets 30 at one end and the sprockets 32 at the opposite end. A front conveyor belt support 33a and a rear support 33b are provided. Each of these is essentially a flat plate along which the wire mesh slides. The wire mesh of the conveyor belt is of an open mesh adapted to be engaged by sprockets 30 and 32.

Toward the left-hand side of FIG. 1, there is seen an upstanding framework 34 which supports the ram and stripper carriage. This framework consists essentially of two parallel upright channels 35 which are secured firmly to the main frame of the machine at their lower ends and which are secured together at the upper ends by means of a channel shape cap 36 and two channel tie bars 37 which pass through the upright channels 35 at opposite ends of the tie bars and are firmly held in position by nuts 38. The ram carriage 39 and the stripper carriage 40 are assembled within the framework 34 for reciprocation in a vertical direction. As best seen in FIG. 1, the ram carriage is narrower lengthwise of the machine and fits inside the wider stripper carriage. The ram carriage has four rotatable guide wheels 39a rotatably mounted at the four corners of the carriage. The stripper carriage has four guide rollers 40a rotatably mounted at the four corners of that carriage. During the vertical reciprocation of the two carriages, all of the guide rollers 39a and 40a engage two parallel guide rails 41, one secured to each of the vertical channels 35 centrally thereof. Each of these guide rails extends from the top cap 36 downwardly to a point indicated at 41a.

The ram 42 is a heavy member having a horizontal portion 42a and a central upstanding flange portion 42b. This ram is firmly fixed at each end between the upper end of two spaced parallel side plates. At their lower ends, each pair of plates 43 are connected together by a pair of parallel cross plates 45. Rigidly connected between the plates 45 are two spaced unlocking spool brackets 46 rigidly connected to the plates 45. Centrally of the plate 45, they are provided with a suitable pin 47 for securing the upper end of a ram drive connecting rod 48 which provides the vertical reciprocation for the ram and stripper carriages. The guide rollers 39a have suitable spacers to position the rollers centrally between plate 43. Recesses 49 and 50 are provided in the side plates 43 to accommodate the guide rollers 40a of the stripper carriage when the two carriages are assembled. Bumpers 51 are provided on the upper side of recesses 49 to limit the upward movement of the stripper carriage. Bumpers 52 are provided at the lower sides of the recesses 49 to engage the upper guide rollers 40a of the stripper carriage to lift the stripper carriage upon upward movement of the ram carriage.

Figure 8:
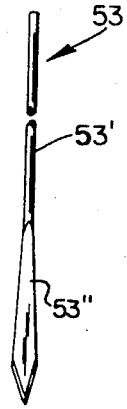
FIG. 8 is an elevational view of one of the tenderizing knives mounted in the ram carriage.

Means is provided for attaching a plurality of tenderizing knives 53 to the underside of the ram 42. In one embodiment, 609 of such knives, as shown in FIG. 8, have their cylindrical shanks 53' force fitted into parallel vertically extending receiving cylindrical openings in a block received in a notched opening 54 in the ram and secured therein by means of a clamping bar 55 and a plurality of wing nuts 56.

The stripper carriage comprises a pair of parallel vertical plates 57 at each side, these plates being secured at each side at the top by the spacer means 58 for the upper guide roller 40a, and at the bottom by similar spacer structure for the bottom guide roller 40a. Near the bottom, the plates 57 are secured by rigidly attached cross angles 60, between which are bolted, at spaced points, two stripper lock assemblies 61. Across the top of the stripper carriage is secured a stripper plate 62 which comprises a rectangular metal frame 62a, centrally of which is mounted a perforated member 62b which in one embodiment is made of Nylon having a plurality of through perforations 62c, each of which is positioned directly below one of the tenderizing knives 53 of FIG. 8 so that when these knives come down through the stripper plate they are accommodated each one by a perforation 62c. The perforations 62c are larger than the shanks 53' of the knives 53 as they must accommodate the spear-like pointed blade parts 53'' of the knives which, as shown in FIG. 8 are relatively flat and wide compared to the size of the cylindrical shanks of the knives. The blades 53'' of the knives 53, as shown in FIG. 8, are more than twice as wide as the cylindrical shank part thereof and have side cutting edges which diverge from one another from the point of the blade towards the shank 53''. The cylindrical shank parts 53' of the knives 53 are longer than the blade parts 53''. At the lower ends of the vertical plates 57 there are provided, at each side, a pair of stop bumpers 63, adapted to stop the downward travel of the stripper carriage when it strikes the stop blocks 64 fastened to the vertical channels 35.

Figure 4:
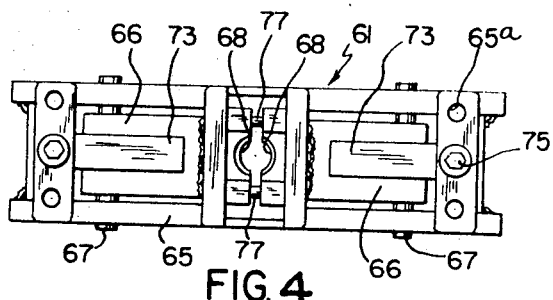
FIG. 4 is a top plan view, enlarged, of a stripper lock assembly.
Figure 5:
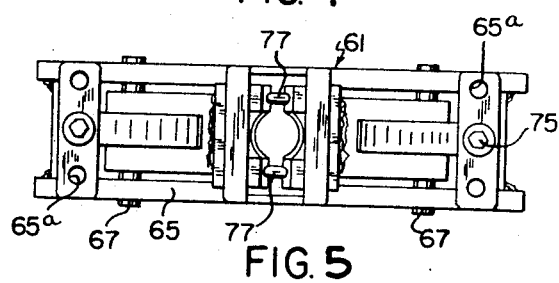
FIG. 5 is a top plan view of the stripper lock assembly like FIG. 4 except with the locking pawls raised to the unlocking position.
Figure 6:
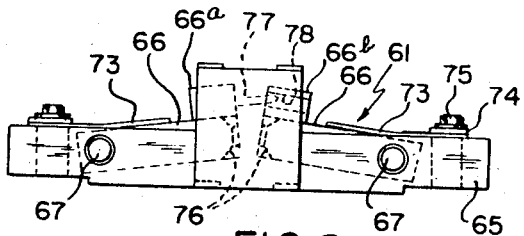
FIG. 6 is a side elevational view of the locking pawl assembly of FIG. 5.
Figure 7:
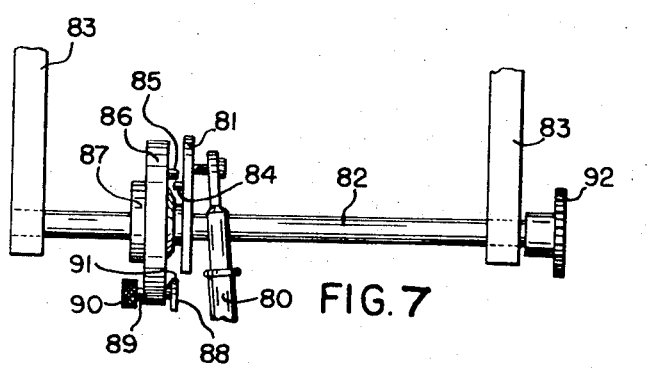
FIG. 7 is a fragmental view, enlarged, taken from the position of the line 7—7 of FIG. 1.

Means is provided for locking the stripper plate 62 relative to the frame of the machine while they blades 53' of the tenderizing knives are withdrawn upwardly out of the meat. This consists of the two stripper lock assemblies. Each stripper lock assembly comprises a frame 65, in which two locking pawls 66 are pivotally mounted about pins 67 which pass into and are held in opposite sides of the frame. The free inner ends of the pawls are provided with arcuate locking recesses 68 which in the closed position of the pawls, shown in FIG. 4, encompass a circular periphery adapted to lock tightly upon either of two locking rods 69. Each of these locking rods is mounted in a bracket 70, each of which is pivoted at one end in the frame spacer bar 25 and in a power mount support 71 at the opposite end. Each of these locking rods passes upwardly through an unlocking spool bracket 46 and through an unlocking spool 72, freely slidable on the locking rod, and then through the associated locking assembly 61 and upwardly therebeyond. Each of the pawls 66 is normally urged to its locking position by a leaf spring 73, each of which has its outer end fixed to the frame 65 by a spring clip 74 held in position by a stud bolt 75. Openings 65a are for bolting the frames 65 to the cross angles 60. The locking pawls are moved to an unlocking position, shown in FIG. 6, when the unlocking spools 72 are lifted upwardly by upward movement of the brackets 46 as the ram carriage lifts the tenderizing blades out of the meat. At this time the upper end of each locking spool enters into the associated recesses 76 on the undersides of the locking pawls, thus lifting them upwardly against the urging of the springs 73. During such lifting of the locking pawls, they are held in proper alignment by two dowel pins 77, each of which is shown fixed in the left-hand portion 66a and remains in engagement with a dowel pin receiving recess 78 in the right-hand pawl portion 66b as seen in FIG. 6.

For causing chunks of meat to travel intermittently with the upper run of the conveyor belt 33 in the direction of the arrow of FIG. 1 when the tenderizing blades are in their uppermost position, a rotatable crank 79 is connected by a drive link 80 with the free end of a drive lever 81 which is freely rotatably on a drive shaft 82. This shaft is rotatably mounted in parallel brackets 83 which extend downwardly from and are supported by the conveyor support member 27. The lever 81 carries a pin 84 adapted to drivingly engage a pin 85 on a clutch drive ring 86. This ring is keyed to a radially outer drive member of a unidirectional clutch 87. This clutch has a radially innermost member which is secured to shaft 82. This clutch is so arranged that, as viewed in FIG. 1, the driving action only occurs when drive lever 81 moves in a counterclockwise direction. It is believed that further description of this clutch is unnecessary here as it forms no part of the present invention. The idle movement of the clutch drive ring 86 is caused by clockwise movement of the drive lever 81 as viewed in FIG. 1. This is controlled by a feed adjustment disk or cam 88 pivotally mounted about a pin 89 fixed on the ring 86. This adjustment is controlled by a knob 90 affixed to the end of pin 89. In the embodiment shown, three possible positions are indicated. A spring pressed detent 91 is fixed in ring 86 and drops into an appropriate recess in the feed adjustment disk 88 in each of the three positions shown. Movement of the pin 84 on lever 81 in a clockwise direction as shown in FIG. 1 will cause it to strike the disk 88 at different positions depending upon the adjustment of disk 88 and move it through a greater or lesser arc and drive the conveyor a predetermined distance. At one end of shaft 82 there is mounted a drive sprocket 92 connected by a drive chain 93 a sprocket 94 mounted on one end of shaft 29 which as previously described causes driving movement of the conveyor belt engaging sprockets 30. A spring pressed idler 95 provides take-up for the drive chain 93.

A common drive means is provided for causing the heretofore described movements of the ram 42 and the conveyor belt 33. This power means comprises a motor 96 mounted on a base 97 which in turn is supported on the power mount 71 and another mounting member 98. The motor drives a sheave 99 which is connected by drive belt 100 to a sheave 101 in a power reduction gearing 102 also mounted on the base 97. The output shaft of the reduction gearing at 103 is fitted with a drive sprocket 104 which is connected by a drive chain 105 with a drive sprocket 106 which, in turn, is fixed to the main drive shaft 107. An idler 108 carried on an L-shape bracket 109 pivoted to the frame at 110 is held by a threaded adjustment pin 111 against the drive chain 105.

The main drive shaft 107 drives a rotatable member 112 which carries the crank arm 79 which controls the conveyor belt drive. This same main drive shaft is provided at its other end with a crank arm 113 which carries a crank pin 114 which is drivingly connected with the lower end of connecting rod 48, the upper end of which is connected to the ram carriage at pin 47. The arrangement of the parts is such that the intermittent movement of the upper run of conveyor 33 occurs while the crank pin 114 is undergoing the upper portion of its travel and the block of tenderizing knives 53 is well above the chunks of meat on the conveyor 33.

An anvil 115 is provided beneath the upper run of conveyor belt 33 at the zone where the tenderizing blades 53'' come down through the meat. An anvil support 116 is secured to the frame and holds the anvil firmly in position so that the meat will be firmly supported beneath the downward thrust of the tenderizing knives the point of the blades of which do not quite touch the conveyor belt 33.

A pair of product guide plates 117 are provided on opposite sides of the conveyor belt 33 as the meat approaches the tenderizing zone. These product guides at each side of the belt insure that the chunks of meat are properly positioned between the block of tenderizing knives 53.

Four safety guards 118 are provided, a pair on each side of the conveyor belt with one guard on each side of the vertical frame 34.

A product height limit bar 119 is supported from the frame of the machine on two vertical brackets 120 in a position to engage oversize chunks of meat as they approach the tenderizing zone traveling on the conveyor belt 33. This insures that excessively thick chunks of meat will not be presented to the tenderizing knives.

Figure 3:
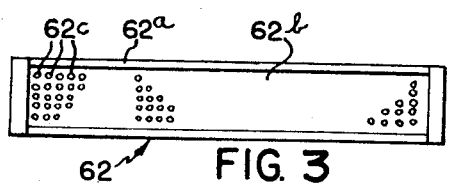
FIG. 3 is a top plan view of the stripper frame or plate taken from the position of the line 3—3 of FIG. 1.

A drip pan 121 is shown in dot-dash lines in FIG. 3. This is to catch meat juices dripping through the conveyor belt and drain the same to the side, after which they are led to one end of the machine to drip into a container.

Guards, not shown, are provided around all of the machinery within the main frame beneath the conveyor belt.

A source of power for the motor 96, and controls therefor are provided but these are all of a standard nature.

During operation of the machine, rotation of motor 96 which will cause rotation of the main drive shaft 107 together with rotational movement of the crank 79 for driving the conveyor belt and of the crank arm 113 for driving the ram carriage. Each downward movement of the link 80 causes clockwise movement of the drive lever 81 as shown in FIG. 1. This causes an idle stroke of the clutch drive ring 86, the amount of which depends upon the position of the feed adjustment disk or cam 88. At each upward stroke of the link 80, the drive lever 81 moves in a counterclockwise direction as viewed in FIG. 1 and this is an active drive movement through the one-way clutch 87, which motion is transmitted to the chain drive 93 to the drive sprocket 94 causing movement of the conveyor 33 a predetermined amount. In one embodiment of the invention, this increment of movement of the belt 33 and the meat thereon may be varied between 3 inches, 1½ inches and 1 inch, depending on the position of the feed adjustment disk 88. These increments are respectively one full width of the blade block 33, lengthwise of the machine, one-half of that width, and one-third of that width so that the meat may be penetrated one, two or three times, as desired. This increment of movement may be varied while the machine is running by a simple adjustment of the control knob 90.

The action of the ram and stripper carriages is as follows. While the meat on the conveyor belt 33 is moving into the tenderizing zone the ram carriage is in the uppermost position as indicated in FIG. 1. In moving to this upper position, the bumpers 52 on the ram carriage have lifted the stripper carriage upwardly by engagement of the upper guide rollers 40a. When these upper guide rollers engage bumpers 51, the blades 53'' of the knives 53 have just about cleared the stripper frame 62, and spools 72 release the locking pawls 66. Further rotation of shaft 107 causes rotation of the crank arm 113 which by means of pin 114 carries the connecting rod 48 downwardly which is connected with pin 47 to move the ram carriage downwardly. At this time, the stripper carriage moves along downwardly freely impelled by gravity until the stripper plate comes to rest on top of the meat. At this point, as ram carriage continues downwardly, the unlocking spools 72, sliding on the guide rods 69, are carried downwardly by downward movement of the unlocking spool brackets 46 on the ram carriage. The locking pawls 66 up to this time have been in the unlocked position. As the unlocking spools 72 travel downwardly, the leaf springs 73 cause the pawls 66 to move to the locking position. The stripper plate 62 then stays in a locked position retive to the frame of the machine until the ram carriage has caused the tenderizing blades 53'' to pass downwardly almost, but not quite, through the meat and back upwardly on the return stroke until the blades are pulled out of the meat, and almost out of the stripper frame 62, on the upstroke. At this time the crank pin 114 is again moving upwardly. As the tenderizing blades 53'' are lifted upwardly out of the meat, the brackets 46 on the ram carriage lift the unlocking spools 72 to engage the recesses 76 in the pawls 66 thus moving the pawls to the unlocking position. Thus, the locking pawls have performed their function of holding the stripper plate firmly in position on top of the meat until the tenderizing blades have been withdrawn from the meat. The ram carriage and stripper carriage again move freely to the uppermost position.

Having thus described our invention, what we claim is:

1. In a meat tenderizer, a main frame, a conveyor on said frame having a generally horizontal run for moving said meat, a ram carriage, means mounted on said frame operatively associated with said carriage for guiding the latter for vertical reciprocation toward and away from said conveyor run, means at the upper end of said ram carriage mounting a plurality of downwardly directed meat tenderizing knives having round shanks terminating in thin flat spear-like blades having side cutting edges along the entire length of each of their sides diverging upwardly from their points, means for moving said conveyor to carry a piece of meat on said run thereof to a position beneath said knives, an anvil beneath said conveyor and said knives to support a piece of meat on said conveyor for penetration by said knives, means effective to move said ram carriage downward and to cause said knives to pierce a piece of meat on said conveyor below said knives, said last-named means being effective thereafter to move said ram carriage upward and to withdraw said knives above the meat, a stripper carriage constructed and arranged to move downwardly and upwardly in coordination with like movements of said ram carriage and in the same zone of movement, a stripper plate on said stripper carriage and arranged to provide clear passage of the blades of said knives through it, said stipper plate being positioned to rest upon the upper surface of a piece of meat in position to be pierced by said knives, means for locking said stripper plate relative to said main frame as said knives are withdrawn upwardly by said ram carriage and for releasing said locking means when said blades are clear of the meat, and means timing said conveyor moving means for advancing a piece of meat on said horizontal run thereof a predetermined distance only when said knives are raised to a position clear of said meat by said ram carriage.

2. In a meat tenderizer having a ram movable toward and from a piece of meat to be tenderized, a tenderizing knife to be carried by the ram for piercing a piece of meat, said knife comprising a cylindrical shank for attachment to the ram and a relatively wide flat thin spear-like pointed blade provided with cutting edges along the entire length of their two sides diverging from the point in the direction of the shank at one end of said shank, the length of said blade being less than that of said cylindrical shank.

* * * * *